(Model.)

C. F. PRENTICE.
EYEGLASS CASE.

No. 432,214.

Patented July 15, 1890.

WITNESSES:
A. B. Chobot
M. V. Cronin

Charles F. Prentice
INVENTOR:

BY L. E. Field,
ATTORNEYS

UNITED STATES PATENT OFFICE.

CHARLES FREDERICK PRENTICE, OF NEW YORK, N. Y.

EYEGLASS-CASE.

SPECIFICATION forming part of Letters Patent No. 432,214, dated July 15, 1890.

Application filed February 12, 1890. Serial No. 340,182. (Model.)

*To all whom it may concern:*

Be it known that I, CHARLES FREDERICK PRENTICE, of the city, county, and State of New York, have invented a new and useful Improvement in Cases for Eyeglasses, of which the following is a full, clear, and exact description, reference being had to the accompanying drawings, forming a part hereof, in which similar letters of reference denote corresponding parts in all the views.

My invention has for its object the provision of a case for the reception of that class of eyeglasses which are provided, in addition to the spring or bow, with inwardly and downwardly extending projections fitting the sides of the wearer's nose; and the invention consists in the novel construction of case hereinafter described and claimed.

The eyeglass-cases commonly in use are not adapted to receive those which are provided with projections adapted to embrace and fit the nose of the wearer, for the reason that such projections render the glasses thicker than the space within the case, and the glasses cannot be passed into the case. It is to do away with this inconvenience that I have devised the eyeglass-case forming the subject-matter of this application.

Figure 1:
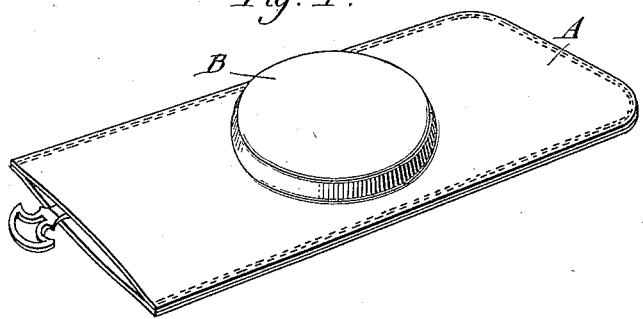
Figure 2:
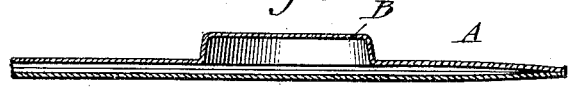
Figure 3:
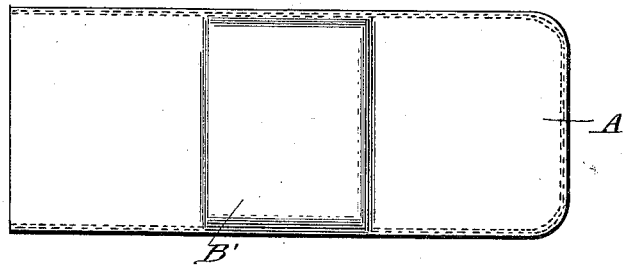
Figure 4:
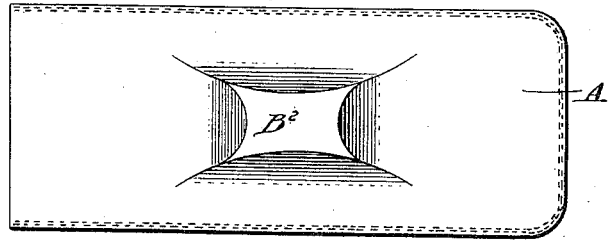

Referring to the drawings, Figure 1 is a perspective view of an eyeglass-case constructed in accordance with my invention with the glasses in place therein. Fig. 2 is a longitudinal section of the same, and Figs. 3 and 4 are plan views showing modified forms of the enlargement in the body of the case.

The body A of the case is preferably constructed of flexible leather; but any other suitable material may be employed for the purpose—as, for instance, papier-maché—having a similar degree of flexibility to that possessed by the leather. One end of the case is open, as ordinarily, which end may or may not have the usual flap, as is preferred or deemed desirable. The body of the case is preferably of such length as will permit of the insertion of the glasses open as in use. In said body, between its extremities, is formed an enlargement adapted to receive the projections of the eyeglasses hereinbefore referred to. Said enlargement may be circular in shape, as shown at B in Figs. 1 and 2, and centrally located in said body, or rectangular in shape, as shown at B' in Fig. 3, and extend across from edge to edge of said body, or anvil-shaped and centrally located in said body, as shown at B² in Fig. 4, or it may have any other preferred shape. Said enlargement is of sufficient height to permit the projections of the eyeglasses to freely enter and be located therein.

In use the case is held in one hand and its side edges gently pressed to enlarge its interior vertically, whereupon the glasses, flat and open, are passed into the open end of the case and gently pushed therein until they extend within the same, the flexibility of the case allowing the projections on the glasses to pass with little difficulty to and into the enlargement in the case. When needed by the wearer, the glasses may be as readily withdrawn.

Having thus fully described my invention, what I claim as new, and desire to secure by Letters Patent, is—

A case for eyeglasses, consisting of the elongated body A, having flat sides, closed and rounded at one extremity and open and straight at its other extremity, and having the circular enlargement B formed integral therewith in one side and midway of its extremities, substantially as shown and described.

In testimony that I claim the foregoing as my invention I have signed my name, in presence of two witnesses, this 7th day of February, 1890.

CHARLES FREDERICK PRENTICE.

Witnesses:
ADOLPH MARSHUETZ, Jr.,
JOHN GINDRAT FREEMAN.